US008246712B2

(12) United States Patent
Sako et al.

(10) Patent No.: US 8,246,712 B2
(45) Date of Patent: Aug. 21, 2012

(54) SOAPSTOCK TREATMENT APPARATUS, SOAPSTOCK TREATMENT METHOD, AND METHOD FOR MANUFACTURING FERTILIZER DERIVED FROM SOAPSTOCK

(75) Inventors: Takeshi Sako, Hamamatsu (JP); Idzumi Okajima, Hamamatsu (JP); Hajime Hori, Chuo-ku (JP); Masahito Furuki, Chuo-ku (JP); Ryousuke Shimobayashi, Chuo-ku (JP)

(73) Assignees: National University Corporation Shizuoka University, Shizuoka-shi (JP); J-Oil Mills, Inc., Tokyo (JP)

( * ) Notice: Subject to any disclaimer, the term of this patent is extended or adjusted under 35 U.S.C. 154(b) by 429 days.

(21) Appl. No.: 12/528,862

(22) PCT Filed: Dec. 20, 2007

(86) PCT No.: PCT/JP2007/001441
§ 371 (c)(1),
(2), (4) Date: Aug. 27, 2009

(87) PCT Pub. No.: WO2008/105035
PCT Pub. Date: Sep. 4, 2008

(65) Prior Publication Data
US 2010/0043509 A1 Feb. 25, 2010

(30) Foreign Application Priority Data

Feb. 27, 2007 (JP) ................. 2007-048192

(51) Int. Cl.
*A62D 3/38* (2007.01)
*C05B 17/00* (2006.01)
*C05D 1/00* (2006.01)
*C05D 9/00* (2006.01)

(52) U.S. Cl. ......... 71/31; 71/32; 71/33; 71/61; 588/320; 588/408

(58) Field of Classification Search .................. 71/6–63; 588/312–321, 408; 422/129–186
See application file for complete search history.

(56) References Cited

U.S. PATENT DOCUMENTS 3,899,440 A * 8/1975 Hoffmann .................. 422/129.1
(Continued)

FOREIGN PATENT DOCUMENTS
CN 1597078 3/2005
(Continued)

OTHER PUBLICATIONS

Office Action issued Feb. 6, 2012, in Chinese Patent Application No. 200780051825.4.

*Primary Examiner* — Wayne Langel
(74) *Attorney, Agent, or Firm* — Oblon, Spivak, McClelland, Maier & Neustadt, L.L.P.

(57) ABSTRACT

Disclosed is a soapstock treatment apparatus which can treat a soapstock produced during a plant oil production process within a short period and with a high degree of efficiency. As shown in FIG. 1, the soapstock treatment apparatus includes a reactor 20 configured to oxidatively decompose a soapstock, an electric heating coil 23 configured to heat water in the reactor 20 at 650° C. which is not less than the critical temperature of water, a high-pressure pump 13 configured to pressurize the water in the reactor 20 at 17 Mpa which is less than the critical pressure of water, and a compressor 33 configured to pressurize the water in the reactor 20 at 17 Mpa which is less than the critical pressure of water. Also, an exhaust pipe 41 for discharging a reaction gas generated by the oxidative decomposition treatment and a waste pipe 51 for discharging a solid (inorganic) residue generated by the oxidative decomposition treatment are connected to the reactor 20. Furthermore, a gas-liquid separator 44 for separating the reaction gas into a gas substance and a liquid substance are connected.

13 Claims, 2 Drawing Sheets

U.S. PATENT DOCUMENTS

| | | | | |
|---|---|---|---|---|
| 5,580,443 | A * | 12/1996 | Yoshida et al. | 208/130 |
| 5,772,722 | A * | 6/1998 | Gednalske et al. | 71/21 |
| 6,382,133 | B1 * | 5/2002 | Gednalske et al. | 119/174 |
| 6,858,058 | B2 * | 2/2005 | Daniels | 71/64.1 |
| 2006/0226048 | A1 * | 10/2006 | Stell et al. | 208/125 |
| 2007/0116637 | A1 * | 5/2007 | Woodruff et al. | 423/478 |
| 2008/0124443 | A1 * | 5/2008 | Daniels | 426/601 |

FOREIGN PATENT DOCUMENTS

| | | |
|---|---|---|
| JP | 9 268086 | 10/1997 |
| JP | 2002 308688 | 10/2002 |
| JP | 2003 245537 | 9/2003 |
| JP | 2004 091783 | 3/2004 |
| JP | 2004 298772 | 10/2004 |
| JP | 2006 231118 | 9/2006 |
| JP | 2006 231120 | 9/2006 |
| JP | 2006 239539 | 9/2006 |

* cited by examiner

SOAPSTOCK TREATMENT APPARATUS, SOAPSTOCK TREATMENT METHOD, AND METHOD FOR MANUFACTURING FERTILIZER DERIVED FROM SOAPSTOCK

This application is a 371 of PCT/JP2007/001441, filed Dec. 20, 2007.

TECHNICAL FIELD

This invention relates to a soapstock treatment apparatus and a soapstock treatment method, which oxidatively decompose a soapstock produced in a manufacturing process of vegetable oils, and a method for manufacturing a fertilizer by using the soapstock treatment apparatus and the soapstock treatment method.

BACKGROUND ART

Generally, in a process of manufacturing vegetable oils such as soybean oil, so-called soapstock is generated. Since the soapstock includes a lot of moisture and oil and is in a form of a highly viscous paste, handling is difficult. Therefore, in the past, most of the soapstock was incinerated as an industrial waste. However, recently an apparatus and a method for producing various kinds of fatty acid and organic fertilizers by using oils contained in the soapstock have been proposed and an effective usage of the soapstock has been tried. For example, Japanese Patent Application Laid-Open No. 2004-91783 (patent document 1) discloses a system for producing a fatty acid ester product and the like by using the soapstock. Also, Japanese Patent Application Laid-Open No. 09-268086 (patent document 2) discloses a method for fertilizing the soapstock.

However, such treatment methods of the soapstock that produces various kinds of fatty acid and organic fertilizers as described above have a problem of treatment efficiency, More specifically, in the soapstock treatment system as shown in the patent documents 1, it takes time for a treatment because there are many processes for treating the soapstock. Also, a maintenance work for operating and controlling each of the processes appropriately becomes complicated. On the other hand, a treatment method of the soapstock described in the patent documents 2, predetermined time is required to ferment and decompose the soapstock. Thus, these treatment methods of the soapstock have a problem that it is not necessarily suitable as a method of treating the soapstock which is produced in great quantities every day.

DISCLOSURE OF THE INVENTION

The present invention has been devised to solve the above-noted problems. An object of the present invention is to provide a soapstock treatment apparatus and a soapstock treatment method which can treat a soapstock produced in a manufacturing process of vegetable oils within a short period with a high degree of efficiency, and also to provide a method for manufacturing fertilizers by using the soapstock treatment apparatus and the soapstock treatment method.

In order to achieve the above-described object, an aspect of the present invention provides a soapstock treatment apparatus for treating a soapstock produced in a manufacturing process of vegetable oil, encompassing an oxidative decomposition means configured to decompose a soapstock by adding an oxidizing agent in water, the water is heated to a critical temperature of water (374° C.) or more and is pressurized at a pressure lower than a critical pressure of water (22 Mpa).

In such a case, the oxidative decomposition means may include an oxidative decomposition tank configured to oxidatively decompose the soapstock; a heating means configured to heat the water in the oxidative decomposition tank at the critical temperature of water (374° C.) or more; a pressurizing means configured to pressurize the water in the oxidative decomposition tank at a pressure lower than the critical pressure of water (22 Mpa); and an oxidizing agent supply means configured to supply the oxidizing agent to the oxidative decomposition tank. Also, in such a case, the temperature of the water in the oxidative decomposition of the soapstock in the oxidative decomposition means may be from 600° C. to 700° C., and also the pressure of the water may be at 10 Mpa or more but less than the critical pressure of water (22 Mpa). Moreover, an oxygen supply ratio of the oxidative decomposition of the soapstock in the oxidative decomposition means may be from 1.0 to 3.0.

According to the aspect of the present invention, the oxidizing agent and the soapstock are supplied into a high-pressure and superheated steam at a temperature of the critical temperature of water (374° C.) or more and at a pressure lower than the critical pressure of water (22 Mpa). And the soapstock is oxidatively decomposed, in other words incinerated. In such a case, the soapstock can be processed only by a configuration which performs oxidative decomposition (incineration) of the soapstock. Therefore, a treatment of the soapstock can be performed in a short time as compared with conventional technology. In addition, since the number of treatment processes is small, the number of processes or maintenances for operating and controlling each of the processes also becomes small. Accordingly, the soapstock can be treated within a short period with a high degree of efficiency.

Also, another aspect of the present invention inheres in a soapstock treatment apparatus encompasses the oxidative decomposition means includes a fluid discharge means configured to discharge a fluid state substance produced by the oxidative decomposition of a soapstock; and a solid discharge means configured to discharge a solid state substance produced by the oxidative decomposition of the soapstock. In such a case, a gas-liquid separator configured to separate the fluid state substance into a gas state substance and a liquid state substance can be provided with the soapstock treatment apparatus.

According to another aspect of the present invention, it is configured that reacting fluids (such as gases and vapors) and solid (inorganic) residues are discharged separately from the oxidative decomposition means. Therefore, the solid (inorganic) residues, such as mineral salts, are not contained in the reacting fluids, and thus, disposal, reuse or recycling of reacting fluids and solid (inorganic) residues becomes easy.

In addition, the present invention can be implemented not only as an invention of an apparatus, but also as an invention of a method. Moreover, the present invention can be also implemented as a fertilizer manufacturing method of manufacturing fertilizers by using the soapstock treatment apparatus and the soapstock treatment method.

More specifically, in a method of treating a soapstock produced in a manufacturing process of vegetable oil, it can be provided that an oxidative decomposition step which oxidatively decomposes the soapstock by adding an oxidizing agent in water, the water is heated above a critical temperature of water (374° C.) and is pressurized at a pressure lower than a critical pressure of water (22 Mpa). According to this, inorganic components contained in the soapstock can be extracted by the oxidative decomposition treatment of the soapstock and reused as fertilizers.

DESCRIPTION OF THE NUMERALS

11—a storage tank, 12—an introducing pipe, 13—a high-pressure pump, 20—a reactor, 21—a screw conveyor, 21a—a driving shaft, 21b—an impeller body, 22—a transfer motor, 23—an electric heating coil, 31—a feed pipe, 33—a compressor, 34—an air inlet, 41—an exhaust pipe, 44—a gas-liquid separator, 51—a waste pipe, and 52—a residue receiver.

BEST MODES FOR CARRYING OUT THE INVENTION

Figure 1:
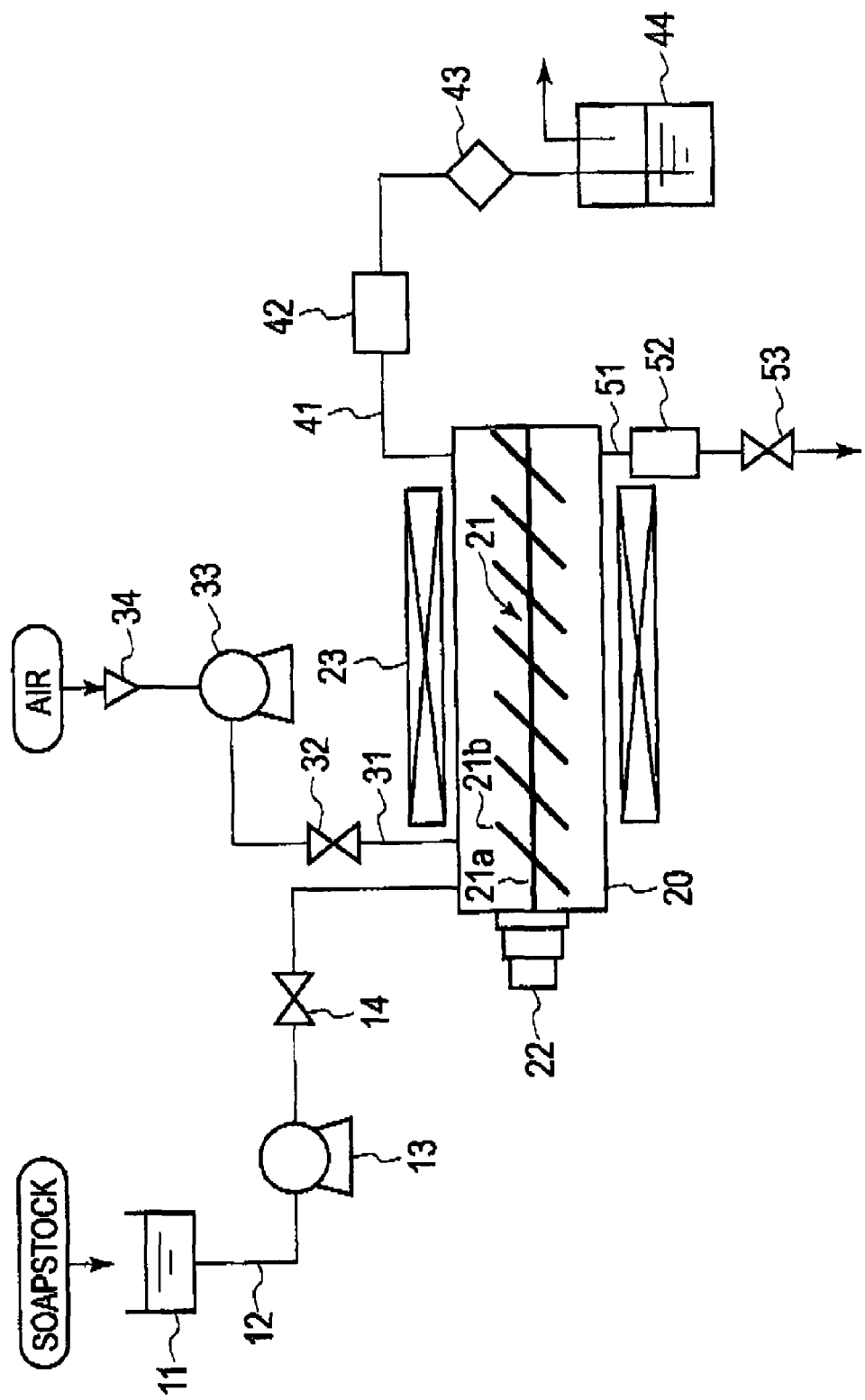
FIG. 1 is a block diagram schematically showing an entire configuration of a soapstock treatment apparatus according to an embodiment of the present invention.

Hereinafter, an embodiment of the present invention will be described with reference to the drawings. FIG. 1 is a block diagram schematically showing an entire configuration of a soapstock treatment apparatus according to an embodiment of the present invention. Here, the soapstock is a by-product which is produced in a manufacturing process of various kinds of vegetable oils (such as soybean oil, corn oil, colza oil, olive oil, sesame oil, etc.) and is in a paste-state substance with high viscosity. This soapstock treatment apparatus is provided with a storage tank 11 which stores a processed material.

The storage tank 11 is a container for storing the soapstock which is a treatment object for the soapstock treatment apparatus and is in a fluid state. An introducing pipe 12 is connected to a bottom portion of the storage tank 11. The introducing pipe 12 is a pipe for introducing the soapstock stored in the storage tank 11 to a reactor 20 via a high-pressure pump 13 and a valve 14. The high-pressure pump 13 is a liquid-sending pump for supplying the soapstock stored in the storage tank 11 to the reactor 20 via the introducing pipe 12 and an operation thereof is controlled by the controller which is not illustrated. In addition, the high-pressure pump 13 pressurizes the reactor 20 at a pressure lower than a critical pressure of water (22 MPa), more specifically, at 17 Mpa, by an operation control of the controller, The valve 14 is a hand-operated valve for adjusting a flow of the soapstock supplied to the reactor 20 via the introducing pipe 12.

The reactor 20 is an approximately cylindrical and horizontal reactor which is formed liquid-tight and airtight to oxidize and decompose the soapstock. This reactor 20 is constructed from a material such as a nickel chrome alloy which can withstand the temperature at a critical temperature of water (374° C.) or more and at a pressure of the critical pressure of water (22 MPa). At an end portion of an upper part of a peripheral surface of the reactor 20 (left side end of a figure), the introducing pipe 12 and a feed pipe 31 for supplying an oxidizing agent into the reactor 20 is connected.

Moreover, at another end portion of the upper part of the peripheral surface of the reactor 20 (right side end of a figure), an exhaust pipe 41 to exhaust reaction gases produced by the oxidative decomposition of the soapstock to the outside of the reactor 20 is connected. Also, a waste pipe 51 for wasting solid (inorganic) residues produced by the oxidative decomposition of the soapstock is connected to a position opposing to the exhaust pipe 41 at a lower part of the peripheral surface of the reactor 20.

A screw conveyor 21 is provided in the reactor 20. The screw conveyor 21 is composed of an approximately strip-shaped impeller body 21b winding around a peripheral surface of a driving shaft 21a which has a form of a round bar shape. The screw conveyor 21 stirs and transports the soapstock supplied in the reactor 20 along with an axial direction of the driving shaft 21a. One end (left side on the figure) of the driving shaft 21a of this screw conveyor 21 penetrates an approximately central portion of one side face (left side face of the figure) of the reactor 20 and coupled with and supported by a transfer motor 22. Another end (right side on the figure) thereof is rotatably connected to another side face (right side face of the figure) of the reactor 20 via a bearing which is not illustrated. That is, the screw conveyor 21 is installed along with a longitudinal direction of the reactor 20, transports and stairs the soapstock from an introducing pipe 12 side to an exhaust pipe 41 side.

The transfer motor 22 is an electric motor fixed to an outside of the one side face (left side face of the figure) of the reactor 20. Operations are controlled by the controller and the driving shaft 21a of the screw conveyor 21 is rotated with the controller. An electric heating coil 23 is provided to wind around and disposed on the peripheral surface of the reactor 20 and between the feed pipe 31 and the exhaust pipe 41. The electric heating coil 23 is a heating apparatus by which an operation is controlled by the controller. The electric heating coil 23 heats water in the reactor 20 at the critical temperature of water (374° C.) or more, more specifically, at around 650° C., and also keeps the temperature condition. In other words, this electric heating coil 23 is a heat source for heating water content contained in the soapstock to the critical temperature of water or more.

An air inlet 34 is connected to the upstream of the feed pipe 31 via the valve 32 and a compressor 33. The valve 32 is a hand valve for adjusting the flow of the air which flows through inside of the feed pipe 31. The compressor 33 is air compression equipment by which an operation is controlled by the controller. Specifically, the compressor 33 compresses air sucked from atmosphere via the air inlet 34, supplies the air to the reactor 20, pressurizes the reactor 20 at a pressure less than the critical pressure of water (22 MPa), specifically, at 17 Mpa, and keeps the pressure. In other words, the compressor 33 supplies oxygen in the air as an oxidizing agent into the reactor 20. In this case, the compressor 33 is controlled by the controller so that an oxygen supply ratio may be set to "2." Here, the oxygen supply ratio refers to a ratio of actual amount of oxygen against required amount of oxygen for oxidatively decomposing organic substances contained in the soapstock in the reactor 20 completely.

A cooler 42, a sintered filter 43 and a gas-liquid separator 44 are respectively provided in the downstream of the exhaust pipe 41. The cooler 42 is controlled by the controller. The cooler 42 cools the exhaust pipe 41 with an air-cooling system and a water-cooling system, and decreases the temperature of the reaction gas at around an ambient temperature. The sintered filter 43 is for separating a solid content contained in the reactant gas discharged from the reactor 20. In addition, the gas-liquid separator 44 is an apparatus for separating steam contained in the reaction gas discharged from the reactor 20 as liquid and for discharging the reaction gas from which the steam was removed to the atmosphere.

A residue receiver 52 and a valve 53 are respectively provided in the downstream of the waste pipe 51. The residue receiver 52 is a container which collects and stores the solid (inorganic) residues generated in the reactor 20. The valve 53 is a hand valve for discharging the solid (inorganic) residues stored in the residue receiver 52.

Operations of the soapstock treatment apparatus as described above will be explained. First, a worker stores paste soapstock (about 60% of water content) in the storage tank 11. And the worker turns on an electric power switch of the soapstock treatment apparatus which is not illustrated, and gives an instruction of a start of a treatment of the soapstock to the controller. Answering this direction, the controller initiates each operation of the compressor 33 and the electric heating coil 23. According to this, inside of the reactor 20 is heated to 650° C. with the electric heating coil 23, an oxidizing agent (air) is also supplied and the reactor 20 is also pressurized at 17 MPa. In this case, the oxidizing agent is supplied into the reactor 20 so that an oxygen supply ratio will be set to "2".

Next, the controller initiates each operation of the high-pressure pump 13, the transfer motor 22, and the cooler 42. According to this, an introduction of the soapstock stored in the storage tank 11 into the reactor 20 is started and also a rotation of the screw conveyor 21 in the reactor 20 is started. The soapstock supplied into the reactor 20 falls freely to a bottom of the reactor 20 and then, the soapstock is agitated by the screw conveyer 21 and transferred to the exhaust pipe 41 side. In this case, a detention time of the soapstock is about 70 minutes. In this agitation and transfer process, the water content contained in the soapstock is exposed to the atmosphere at 650° C. (above the critical temperature of water (374° C.)) and at 17 Mpa, turns into high-pressure and superheated steam, and dissolves organic substances contained in the soapstock. The organic substances dissolved in the high-pressure and superheated steam are oxidatively decomposed by the oxidizing agent supplied into the reactor 20, and are converted into reaction gas which is composed of steam, carbon dioxide, nitrogen gas, and the like. In addition, the inorganic substances (phosphorus, sodium, calcium, potassium, etc) contained in the soapstock are separated out as powdered solid (inorganic) residues.

The reaction gas generated by oxidation treatment of the soapstock is introduced to the cooler 42, the sintered filter 43, and the gas-liquid separator 44 via the exhaust pipe 41. The gas-liquid separator 44 emits carbon dioxide gas and nitrogen gas to the atmosphere while liquefying and storing the steam contained in the reaction gas. Water stored in the gas-liquid separator 44 may be discarded as it is and may be used for other uses. On the other hand, the solid (inorganic) residues are introduced to the waste pipe 51 by the screw conveyor 21, and thereafter collected in the residue receiver 52. The solid (inorganic) residues collected in the residue receiver 52 may be discarded as it is and may be used for other uses, for example, fertilizers etc. In other words, if the solid (inorganic) residues collected in the residue receiver 52 are used as fertilizer, this soapstock treatment apparatus can be regarded as a manufacturing apparatus for manufacturing fertilizers derived from the soapstock and can also be regarded as a method of manufacturing the fertilizers.

Figure 2:
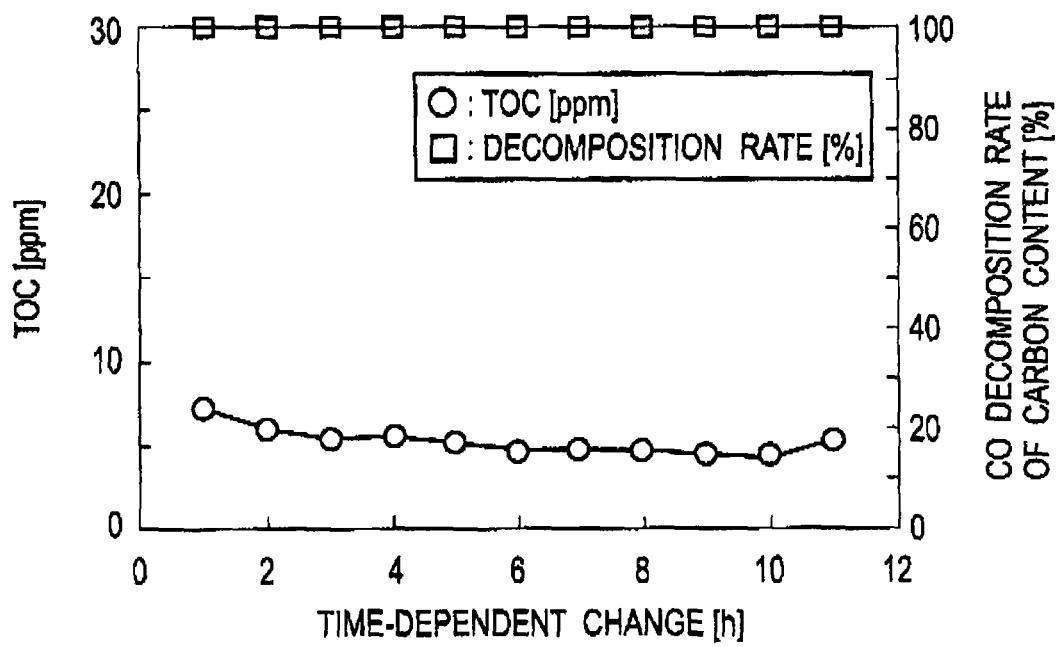
FIG. 2 is a graph showing an example of a time-dependent change of TOC (an amount of total organic carbon) and decomposition rates of carbon in discharged water when a soapstock is treated with the soapstock treatment apparatus as shown in FIG. 1.
Figure 3:
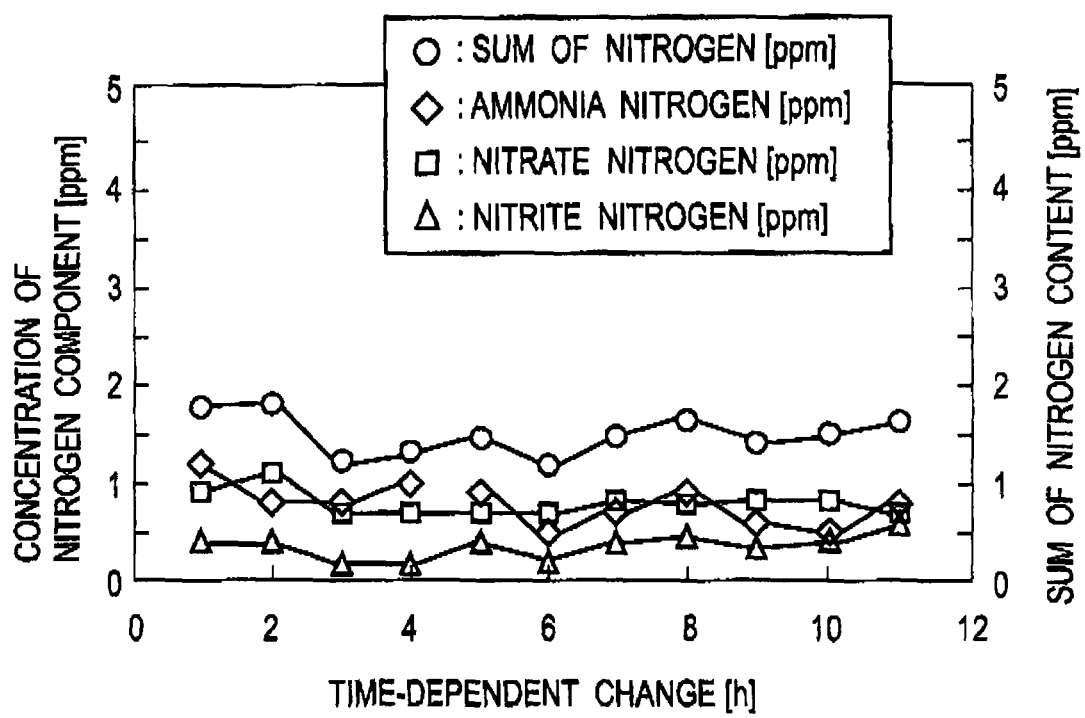
FIG. 3 is a graph showing an example of a time-dependent change of concentrations of various kinds of nitrogen components and sum of the nitrogen components.

In this way, an oxidation treatment of the soapstock is performed continuously and the soapstock including organic substances is decomposed into harmless substances, such as water, carbon dioxide gas, nitrogen gas, mineral matter, and the like. And when all of the soapstock is oxidized, the worker stops the operation of the soapstock treatment apparatus, and ends the oxidation treatment work of the soapstock. FIG. 2 shows a time-dependent change of TOC (an amount of total organic carbon) and decomposition rates of carbon in wastewater when the soapstock is treated with this soapstock treatment apparatus. FIG. 3 shows a time-dependent change of concentrations of various kinds of nitrogen components ($NH_4^+$ state nitrogen, $NO_2^-$ state nitrogen, $NO_3^-$ state nitrogen) contained in the wastewater and a sum S of the nitrogen components. In such a case, the sum S of the nitrogen components is expressed by the following formula 1.

$$\text{The sum S of the nitrogen components} = NH_4^+ \times 0.4 + NO_2^- + NO_3^- \qquad \text{Formula 1}$$

As shown in FIG. 2, TOC contained in the wastewater is 5-8 ppm from a start of the treatment of the soapstock after another twelve hours. The carbons contained in the soapstock are decomposed approximately 100%. Also, as shown in FIG. 3, ammonia nitrogen, nitrate nitrogen and nitrite nitrogen which are contained in the wastewater are 1.5 ppm or less and these total quantities are also 2 ppm or less. That is to say, according to the soapstock treatment apparatus in accordance with the present invention, the soapstock can be processed in a short time, without producing a toxic substance.

As understood from the above-described operation, according to the above-described embodiment, the oxidizing agent and the soapstock are supplied to the high-pressure and superheated steam whose temperature is at 650° C. and whose pressure is at 17 Mpa, and the soapstock is oxidatively decomposed, in other words incinerated. In this case, a main configuration and process for carry out the oxidative decomposition treatment (incineration) is only the reactor 20. Therefore, it has fewer processes for treating the soapstock than the conventional technology and the soapstock can be treated in a short time. In addition, since the treatment processes have fewer steps, the number of processes or maintenances for operating and controlling each of the processes is decreased. Accordingly, the soapstock can be treated within a short time with a high degree of efficiency.

In addition, according to the above-described embodiment, it is configured that the reaction gas and the solid (inorganic) residues are discharged independently from the reactor 20 and also the reaction gas is separated into liquid water and gas with the gas-liquid separator 44. Therefore, mineral salt, and the like are not included in the wastewater, It becomes easy to waste, reuse or recycle the reacting substances.

Also, it is not limited to the above-described embodiment. Various modifications will become possible without departing from the object of the present invention.

In the above-described embodiment, the soapstock produced in the manufacturing process of vegetable oil is used as the processed material. However, it is not limited to this, More specifically, a mixture that contains the soapstock can be included as the processed material. For example, a mixture of soapstock including water, oil and the like, a mixture including different kinds of plants, or a mixture including various kinds of soapstock produced in different processes can be included therein. It can be expected to give the same effect as the above-described embodiment with this.

Also, in the above-described embodiment, the reactor 20 of the horizontal type prolonged in left and right directions of the figure is explained as an example. However, it is not limited to this. More specifically, a vertical type reactor 20 may be used. Also, a horizontal type reactor 20 that has a rising gradient toward the exhaust pipe 41 side can be used. It can be expected to give the same effect as the above-described embodiment with this.

Also, in the above-described embodiment, the temperature of water in the reactor 20 is at 650° C. However, it will not be limited to this if the temperature is set over the critical temperature of water (374° C.). In such a case, it is preferable to set the temperature of water at 600° C. or more in order to prevent nitrogen contents in the organic substances included in the soapstock from converting into ammonia. It can be expected to give the same effect as the above-described embodiment with this. In addition, the soapstock can be treated in the high-pressure superheated steam with a temperature above the critical water temperature (374° C.) or more, and at a temperature of 600° C. or less. According to this, the heat resistance performance of the reactor 20 may be lowered and a simple configuration can be accomplished.

Also, in the above-described embodiment, the pressure of the water in the reactor 20 is set to 17 Mpa. However, it will not be limited to this if the pressure will be less than the critical pressure of water (22 MPa). The purpose of this is to prevent nitrogen in the organic substances from converting into the nitrous oxide and to keep the decomposition rate of carbon contents of the organic substances in the soapstock at a high value (not less than 99%). Therefore, the pressure of water in the reactor 20 is preferably kept less than the critical pressure of water (22 Mpa). Specifically, it will be preferable to set the pressure of the water from 5 Mpa to 22 Mpa, more preferably from 13 Mpa to 19 Mpa. It can be expected to give the same effect as the above-described embodiment with this.

Also, in the above-described embodiment, the air (oxygen) which is an oxidizer is supplied in the reactor 20 so that an oxygen supply ratio might be set to "2", but it is not limited to this. The oxygen supply ratio is a parameter that affects the treatment time of the soapstock introduced into the reactor 20. More specifically, when the value of the oxygen supply ratio becomes greater, the amount of the oxidizing gent supplied to the reactor 20 becomes larger and the time for the oxidative decomposition treatment of the soapstock becomes shorter. According to the inventor's experimentation, the oxygen supply ratio may be preferably set in a range of 1-3. Additionally, the temperature and the pressure of water, the oxygen supply ratio, the detention time of the soapstock in the reactor 20, and the like, can be set in a comprehensively manner according to the types, properties, and quantities of the soapstock to process.

Also, in the above-described embodiment, it is configured that the exhaust pipe 41 and the waste pipe 51 are provided with the reactor 20, the reaction gas produced by the oxidative decomposition of the soapstock and the solid (inorganic) residues are collected, and the collected reaction gas is separated into a gas substance and a liquid substance. More specifically, in the present embodiment, the reacting substances produced by the oxidative decomposition of the soapstock are collected separately in each phase (the gaseous phase, liquid phase, solid phase). The purpose of this is to facilitate waste or reuse of the reacting substances generated by the oxidative decomposition reaction of the soapstock by collecting the reacting substances separately in each phase. The configuration for collecting the reacting substances generated by the oxidative decomposition of the soapstock in each phase separately is not indispensable configuration to carry out the oxidative decomposition of the soapstock. The method of collecting the reacting substances produced by the oxidative decomposition of the soapstock can be determined by a final disposal method of the reacting substances and it is not limited to the present embodiment as described above, For example, it may be configured that the reacting substances generated by the oxidative decomposition of the soapstock are exhausted from one waste tube to the outside of the reactor 20.

Also, in the above-described embodiment, the electric heating coil 23 is used as a heat source for heating water in the reactor 20 at 650° C., which is not less than the critical temperature of water. The high-pressure pump 13 and the compressor 33 are used as a pressure source. However, these heat source and the pressure source show an example, and it is a matter of course that the present invention is not limited to these.

Also, in the above-described embodiment, air is used as an oxidizing agent. However, it will not be limited to this if the material can oxidize the processed material. For example, oxygen, ozone, hydrogen peroxide, and the like can be used as the oxidizing agent. It can be expected to give the same effect as the above-described embodiment by using these things.

The invention claimed is:

1. A method of treating a soapstock produced in a manufacturing process of vegetable oil, comprising:
   oxidatively decomposing said soapstock in water by adding an oxidizing agent, wherein the water is heated to 374° C. or more and is pressurized at a pressure lower than 22 Mpa.

2. The method of treating a soapstock according to claim 1, further comprising:
   introducing the soapstock into an oxidative decomposition tank to oxidatively decompose the soapstock;
   heating the water in the oxidative decomposition tank 374° C. or more;
   pressurizing the water in the oxidative decomposition tank at a pressure lower than 22 Mpa; and
   supplying the oxidizing agent to the oxidative decomposition tank.

3. The method of treating a soapstock according to claim 1, wherein
   the temperature of the water in the oxidative decomposition of the soapstock in the oxidative decomposition is from 600° C. to 700° C., and
   the pressure of the water is at 10 Mpa or more and is less than 22 Mpa.

4. The method of treating a soapstock according to claim 1, wherein
   an oxygen supply ratio of the oxidative decomposition of the soapstock in the oxidative decomposition is from 1.0 to 3.0.

5. The method treating a soapstock according to claim 1, wherein the oxidative decomposition further comprises:
   discharging a fluid state substance produced by the oxidative decomposition of the soapstock; and
   discharging a solid state substance produced by the oxidative decomposition of the soapstock.

6. The method of treating a soapstock according to claim 5, further comprising
   separating the fluid state substance into a gas state substance and a liquid state substance.

7. The method of treating a soapstock according to claim 2, wherein the temperature of the water in the oxidative decomposition of the soapstock in the oxidative decomposition is from 600° C. to 700° C., and the pressure of the water is at 10 Mpa or more and is less than 22 Mpa.

8. A method of manufacturing a fertilizer, comprising:

oxidatively decomposing a soapstock produced in a manufacturing process of vegetable oil by adding an oxidizing agent in water, heating the water to 374° C. or more and pressurizing the water at a pressure lower than 22 Mpa, and collecting solid inorganic residues produced during said decomposing.

9. The method according to claim 8, wherein the oxidative decomposition comprises:

introducing the soapstock into an oxidative decomposition tank to oxidatively decompose the soapstock;

heating the water in the oxidative decomposition tank at 374° C. or more;

pressurizing the water in the oxidative decomposition tank at a pressure lower than 22 Mpa; and supplying the oxidizing agent to the oxidative decomposition tank.

10. The method according to claim 8, wherein the temperature of the water in the oxidative decomposition of the soapstock in the oxidative decomposition is from 600° C. to 700° C., and the pressure of the water is at 10 Mpa or more and is less than 22 Mpa.

11. The method according to claim 8, wherein an oxygen supply ratio of the oxidative decomposition of the soapstock in the oxidative decomposition is from 1.0 to 3.0.

12. The method of claim 8, wherein the oxidative decomposition further comprises:

discharging a fluid state substance produced by the oxidative decomposition of the soapstock; and discharging a solid state substance produced by the oxidative decomposition of the soapstock.

13. The method according to claim 12, further comprising separating the fluid state substance into a gas state substance and a liquid state substance.

* * * * *